US006963736B2

(12) United States Patent
Tähtinen

(10) Patent No.: US 6,963,736 B2
(45) Date of Patent: Nov. 8, 2005

(54) METHOD FOR RECEIVING A RADIO FREQUENCY (RF) SIGNAL AND RF RECEIVER

(75) Inventor: Iikka Tähtinen, Turku (FI)

(73) Assignee: Nokia Corporation, Espoo (FI)

( * ) Notice: Subject to any disclaimer, the term of this patent is extended or adjusted under 35 U.S.C. 154(b) by 466 days.

(21) Appl. No.: 10/120,184

(22) Filed: Apr. 11, 2002

(65) Prior Publication Data

US 2002/0159541 A1   Oct. 31, 2002

(30) Foreign Application Priority Data

Apr. 11, 2001  (FI) ............................ 20010760 U

(51) Int. Cl.[7] .............................................. H04B 1/16
(52) U.S. Cl. ............................ 455/343.1; 455/343.5; 455/343.6; 455/874
(58) Field of Search ........................... 455/180.3, 343, 455/425, 817, 38.3, 127, 872, 90, 579, 556, 455/557, 571–574, 866, 403, 290.1, 299.1, 455/247.1, 250.1, 32.1, 343.1, 303.2, 343.5, 455/343.6, 13.4, 20.23, 822, 67.11, 127.1, 455/131–138, 182.1, 183.1, 190.1, 182.2, 455/192.1, 192.2, 198.1, 216.1, 260, 298, 455/311–313; 370/311, 310

(56) References Cited

U.S. PATENT DOCUMENTS

| | | | |
|---|---|---|---|
| 5,224,152 A | 6/1993 | Harte | |
| 5,515,364 A | 5/1996 | Fague | |
| 5,521,947 A | 5/1996 | Madsen | |
| 5,568,513 A | 10/1996 | Croft et al. | |
| 5,606,739 A | 2/1997 | Goto | |
| 5,613,235 A | 3/1997 | Kivari et al. | |
| 5,666,355 A * | 9/1997 | Huah et al. | 370/311 |
| 5,790,946 A * | 8/1998 | Rotzoll | 455/343.1 |
| 5,878,336 A | 3/1999 | Cashen et al. | |
| 5,991,279 A * | 11/1999 | Haugli et al. | 370/311 |
| 5,995,820 A * | 11/1999 | Young et al. | 455/343.1 |
| 6,205,343 B1 * | 3/2001 | Montgomery, Jr. | 455/574 |
| 6,311,081 B1 * | 10/2001 | Northcutt et al. | 455/574 |
| 6,374,127 B1 * | 4/2002 | Park | 455/572 |
| 6,741,961 B2 * | 5/2004 | Lim | 704/229 |
| 6,754,472 B1 * | 6/2004 | Williams et al. | 455/100 |

FOREIGN PATENT DOCUMENTS

| | | |
|---|---|---|
| EP | 0 829 967 A2 | 3/1998 |
| EP | 0 891 046 A2 | 1/1999 |
| EP | 0 939 495 A1 | 9/1999 |
| EP | 0 959 574 A2 | 11/1999 |
| WO | WO 96/03811 | 2/1996 |
| WO | WO 00/36861 | 6/2000 |

* cited by examiner

Primary Examiner—Pablo N. Tran
(74) Attorney, Agent, or Firm—Banner & Witcoff, Ltd.

(57) ABSTRACT

The invention relates generally to a method and an arrangement for receiving a radio frequency (RF) signal and an RF receiver. Particularly the invention relates to controlling and reducing power consumption in a radio receiver. The invention can advantageously be applied in receiving arrangements of radio systems, wherein information is transferred in bursts, such as a receiver of Digital Video Broadcasting (DVB) system. According to the invention, during the time between two bursts the power supply is maintained in at least in some parts of the phase locked loop PLL (240), while one or several other parts (202, 204, 224, 225, 230, 262, 270) of the receiver are turned off for a certain time period between the two bursts. The present invention enables fast tuner lock-in time and still offers a considerable saving in total power consumption of the receiver.

13 Claims, 3 Drawing Sheets

METHOD FOR RECEIVING A RADIO FREQUENCY (RF) SIGNAL AND RF RECEIVER

FIELD OF THE INVENTION

The invention relates generally to a method and an arrangement for receiving a radio frequency (RF) signal, and an RF receiver. Particularly the invention relates to controlling and reducing power consumption in a radio receiver.

BACKGROUND OF THE INVENTION

In the following, DVB system and DVB receivers are described as examples, although the use of the invention is not restricted to the DVB system. Digital video broadcasting has been under development, and it is seen to gradually replace the analog broadcasting systems. This is because of its ability to offer new types of services and better quality of service. Digital Video Broadcasting has been under standardisation by European Broadcasting Union (EBU) and European Telecommunications Standards Institute (ETSI) that have created a DVB standard ETS 300 800. In the digital broadcasting system data is transferred in bursts within determined time slots. The modulation is e.g. Orthogonal Frequency Division Multiplex (OFDM) modulation.

With digital video broadcasting it is possible to achieve a good quality data transfer even if the receiver is mobile. Therefore the mobile applications of terrestrial DVB (DVB-T) will be important. However, the mobile DVB receivers should be small-sized and lightweight with small-sized batteries. Also, the available time of operation between charging the batteries should be long. In achieving this, the power consumption of mobile DVB receivers may become a problem.

A typical DVB receiver tuner comprises RF IC's and discrete RF blocks. Most of the tuner IC's are operated with +5 V power supply. If the power supply is provided by a low voltage battery (3.7 V), the supply voltage for RF parts must be generated using a voltage converter. While the transmission of data consists of bursts, it would be possible to turn off the receiver for the period of time between the bursts. This kind of solutions are described in patent documents U.S. Pat. Nos. 5,878,336 and 5,515,364. However, there are certain problems related with applying these solutions in a DVB receiver. Firstly, the period between two consecutive bursts may be short and the tuner cannot be switched off, during the transmission break.

A further problem is related to a certain type of step-up converter. Even if the converter is switched off, the output voltage of the converter does not drop down to zero. The remaining supply voltage appears also in the tuner power supply line and consumes power.

SUMMARY OF THE INVENTION

It is an objective of this invention to provide a receiving method and a receiver that offers solutions to the prior art problems. Especially, it is an object of this invention to provide a solution for reducing a power consumption of the receiver, and still to maintain stable receiving conditions.

The objectives of the invention are fulfilled by providing a procedure, in which parts of a receiver can be separately turned on/off. The invention is partly based on discovery that power consumption can be reduced by switching the RF block partially on/off. The power is maintained at least some parts of the phase locked loop, while the power is switched off from other parts of the receiver. This is because tuner recovery from power-down to ready-to-receive-data time is mainly originated by the PLL lock-in time. According to an embodiment of the invention, during the time between two bursts/transmission breaks the power supply is maintained in at least in some parts of the phase locked loop, while one or several other parts of the receiver are turned off. If there are no bursts/transmission breaks to be received for a longer period of time, the phase locked loop is advantageously turned off.

The invention can be implemented by, for example powering the phase locked loop directly from a low voltage battery (such as +3,7 V). Other RF parts of the tuner can be powered using step-up converter to generate tuner supply voltage (+5 V). Tuner supply voltage can be switched off during the periods between the bursts, keeping the phase locked loop powered. The demodulator may also be switched off during the period between the bursts by e.g. controlling an internal switch off function. Another voltage converter is needed for generating the high tuning voltage for the VCO (voltage controlled oscillator). Tuning voltage converter may also be switched off during the time between two bursts/transmission breaks. Both voltage converters can be controlled using a common control signal, if the settling time of the tuning voltage converter is adequate.

The present invention enables fast tuner lock-in time and still offers a considerable saving in total power consumption of the receiver.

In accordance with a first aspect of the invention, there is provided a method for receiving multi-carrier radio frequency signals that include modulated information, wherein the method comprises a step for maintaining a power of at least one part of a powered receiver while turning off the power from another receiver part depending on a state of a transmission.

In accordance with a second aspect of the invention, there is provided a method for receiving radio frequency signals that include modulated information, wherein the said radio frequency signals appear as bursts, and the method comprises the steps of producing a local frequency signal with an oscillator, controlling the frequency of said oscillator with a phase locked loop, mixing the input signal with the local frequency signal for producing an intermediate frequency signal, and demodulating the intermediate frequency signal for producing a data stream of said information, and supplying power for the receiver means providing said method steps, wherein during a period between receiving two consecutive bursts the method further comprises the step of supplying continuously power to the means providing the step of demodulation, and the step of turning off the supply power for a determined period of time from a receiver part providing another of said steps for receiving.

In accordance with a third aspect of the invention, there is provided a receiver for receiving and processing multi-carrier radio frequency signals that include modulated information, wherein the receiver comprises means for keeping at least a part of the receiver powered depending on a state of a transmission, and a controller for turning off supply power from another receiver part for a determined time depending on a state of the transmission.

In accordance with a fourth aspect of the invention, there is provided a receiver for receiving and processing radio frequency signals that include modulated information, wherein the said radio frequency signals appear as bursts, the receiver comprising an oscillator for producing a local frequency signal, a phase locked loop for controlling the frequency of the local frequency signal, a mixer for mixing the input signal with the local frequency signal for producing an intermediate frequency signal, and a demodulator for producing a data stream of said information, and a power supply for supplying power for the receiver, wherein the receiver comprises means for keeping at least a part of the phase locked loop powered during a period between two consecutive bursts to be received, and means for turning off the supply power from another receiver part for determined time during said period between two consecutive bursts to be received.

Some preferred embodiments of the invention are presented in dependent claims.

The term "phase locked loop" is often understood to include the controlled oscillator for producing the output signal. However, in this text, a "phase locked loop" is considered to include the control parts, and the controllable oscillator is not considered be included in the term. This definition is due to the fact that the oscillator is advantageously located in an integrated circuit together with the mixer, while the control parts are located in a separate integrated circuit.

The term "burst" is often understood to comprise a discontinuous transmission. However, in some DVB or broadcast context the "burst" can be applied for continuous transmission with transmission breaks or breaks in data transmission both in the DVB transmission.

For better understanding of the present invention reference is made to the following description, taken in conjunction with the accompanying drawings, and its scope will be pointed out in the appending claims.

BRIEF DESCRIPTION OF THE DRAWINGS

In the following, the invention is described in more detail by means of the attached drawings in which.

DESCRIPTION OF THE EMBODIMENTS

Figure 1:
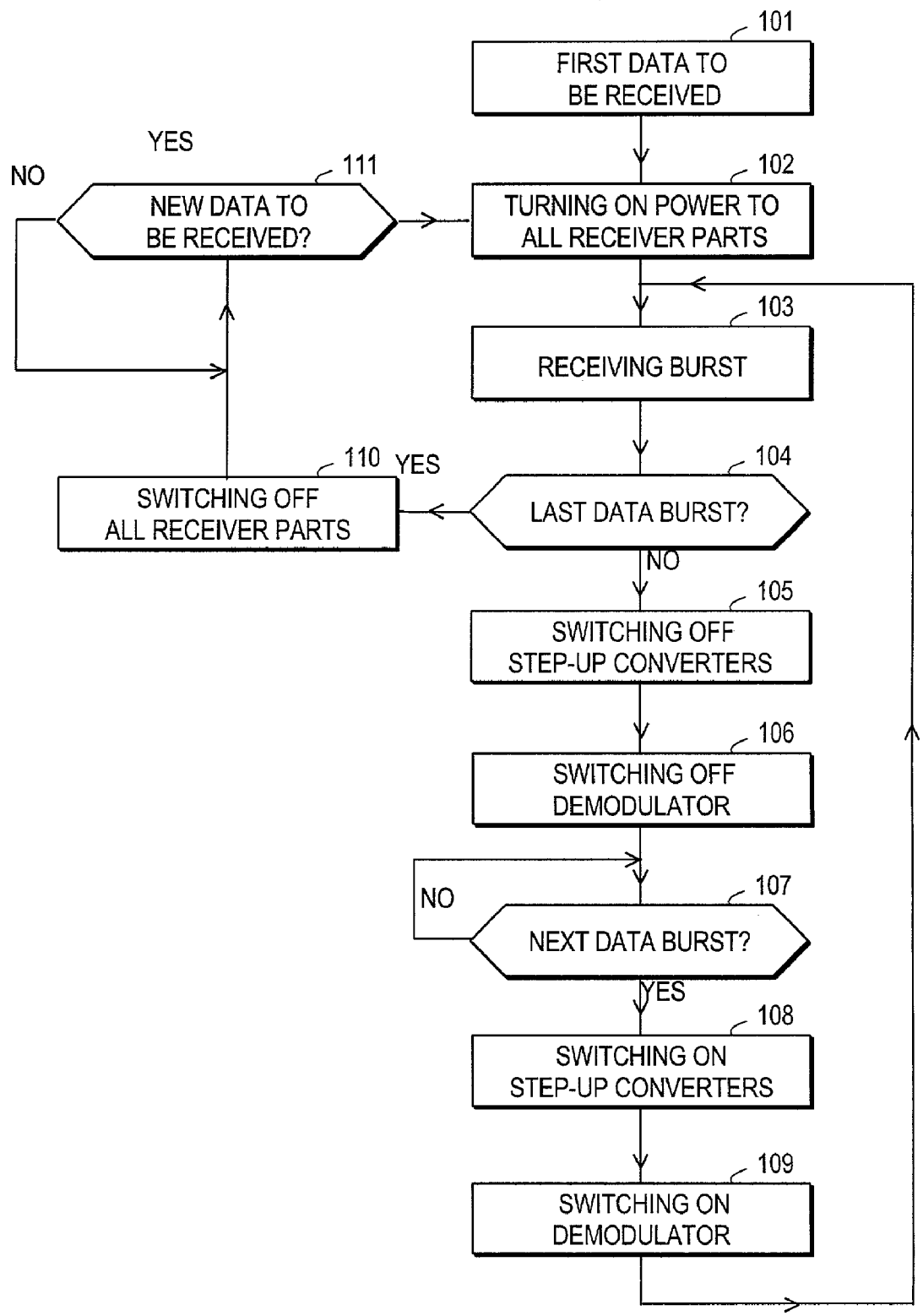
FIG. 1 illustrates a flow diagram of an example for method according to the invention.

FIG. 1 illustrates a flow diagram of an example for a method according to the invention. When there is a data transmission to be received, 101, all receiver parts are turned on, step 102. A burst is then received on step 103, and after receiving the burst the step-up converters and the demodulator are turned off, 105, 106. However, at least some parts of the phase locked loop remain powered. The next burst is then awaited, 107. Since the RF signal processing of the receiver is in off state, the receiver cannot monitor the appearance of the next burst, so the receiver must have the information on the time instant when the next burst is to be received. This information may, for example, be based on predetermined time intervals between the bursts. When the next burst is to be received, 107, the step-up converters and the demodulator are switched on, 108, 109, and the next burst is received, 103.

When there is no further data to be received, 104, all RF signal processing parts of the receiver may be turned off, 110. However, the receiver should then have information on when new data is to be received, 111. Alternatively the receiver may periodically switch on the tuner and check, whether there is new data to be received.

Figure 2:
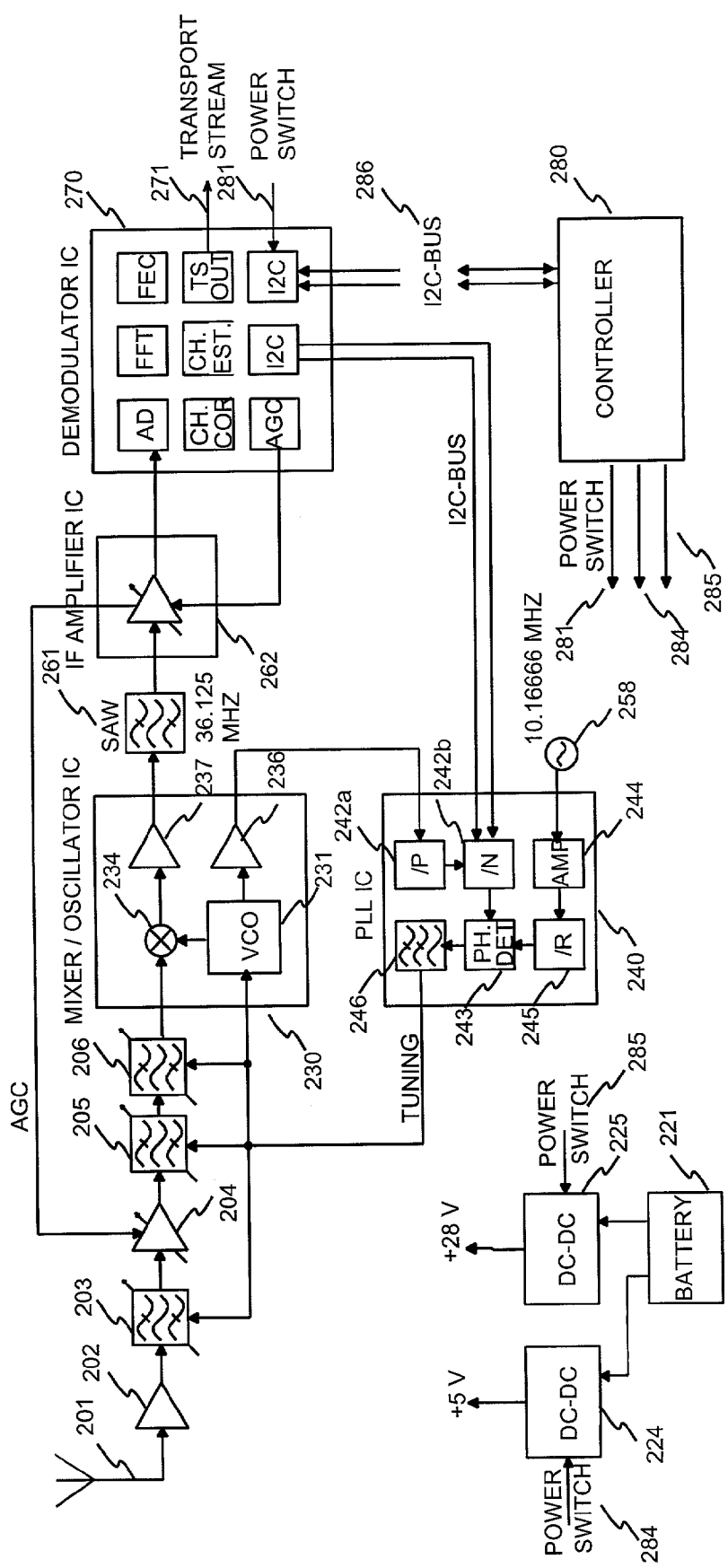
FIG. 2 illustrates an example of a receiver according to the invention.

FIG. 2 illustrates an example of a receiver according to the present invention. The RF signal is received from the radio interface with an antenna 201, and the received signal is amplified in a pre-amplifier 202. The signal is then filtered with a band-pass type tracking filter 203, and again amplified in a variable gain AGC (Automatic Gain Control) amplifier 204. After filtering with band-pass type tracking filters 205 and 206, the signal is led to a mixer 234. A voltage controlled oscillator 231 provides a local oscillator signal to the second input of the mixer. An intermediate frequency signal from the mixer output is amplified, 237, and filtered with a selective SAW (Surface Acoustic Wave) band-pass filter 261. The filtered signal is amplified with an IF amplifier 262, which gives a feedback control signal for the AGC amplifier 204. The amplified IF signal is led to a demodulator 270 that demodulates the intermediate frequency signal into a transport bit stream corresponding to the information that has been modulated into the RF signal. The demodulator may include several functional blocks such as an Analog-to-Digital converter AD, a Fast Fourier Transformer FFT, Forward Error Correction unit FEC, a channel correlation unit CH. COR., a channel estimator CH. EST., an AGC unit, an interface for a I2C bus, and an output buffer for the transport stream TS OUT.

Next the function of a simplified synthesizer circuit according to FIG. 2 is shortly explained. The synthesizer of the receiver comprises a PLL (Phase Locked Loop) 240, which controls the VCO (Voltage Controlled Oscillator) 231, the output signal of which is amplified by the amplifier 236 in order to generate the output signal for the PLL. The frequency of the signal provided by the oscillator 231 is divided in a dual modulus frequency divider comprising a prescaler 242a, and counters 242b. The resulting signal is led to the phase comparator 243. Correspondingly, the signal generated by the reference oscillator 258 is amplified, 244, and the frequency of the reference oscillator, e.g. 10.16666 MHz, is divided down to comparison frequency 245, and further supplied to the second input of the phase comparator 243. The phase comparator outputs a signal which is proportional to the phase difference of said two input signals, whereby the output signal is supplied to a low pass filter 246, and the filtered signal will further control the frequency of the voltage controlled oscillator 231. The described phase locked loop operates in a known way so that the output frequency of the synthesiser is locked to the frequency coming to the phase comparator from the reference frequency branch. The output frequency is controlled by setting a value for the divisor N. This control is made e.g. by the demodulator through an I2C control bus.

Low voltage battery 221 of e.g. 3,7 V, the voltage of which is converted to tuner supply voltage and VCO tuning voltage using two separate step-up converters. The first step-up converter 284 supplies e.g. (+5 V) supply voltage, and the second step-up converter supplies e.g. the (+28 V) tuning voltage. The step-up converters are turned on/off with "power switch" control signals 284 and 285, respectively. The power switch control signals are received, for example, from a controller unit 280. The control unit may also control the demodulator to on/off states with a further power switch signal 281, or through the I2C bus.

Figure 3:
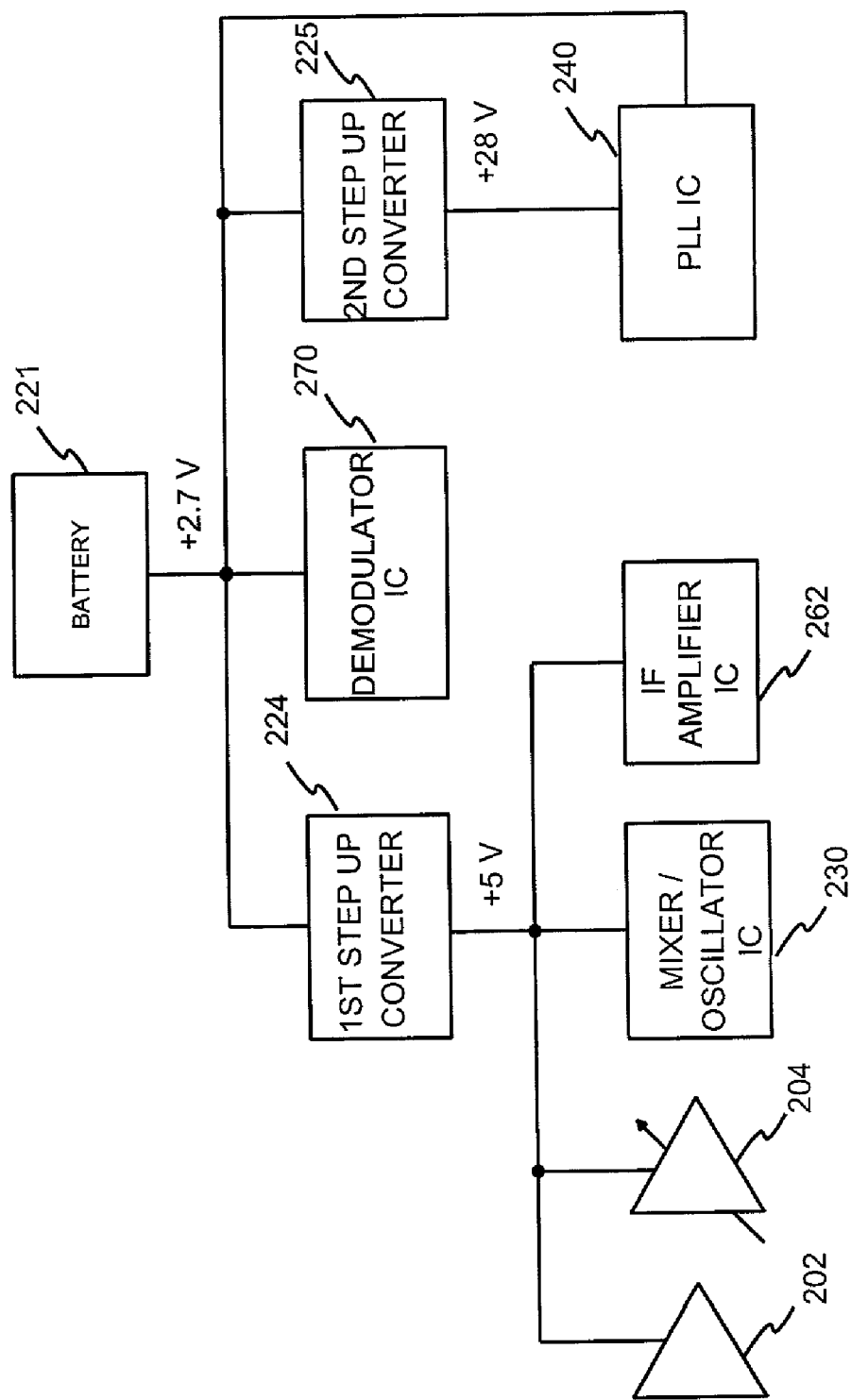
FIG. 3 illustrates an example of a power supply arrangement of a receiver according to the present invention.

FIG. 3 illustrates how the power supply is connected to different parts of the receiver that is illustrated in FIG. 2. The low voltage IC 240 comprising the phase locked loop is connected directly to the battery power supply 221, as well as the voltage step-up converters 224 and 225 and the demodulator IC 270. Other RF IC's and RF blocks are connected to the tuner power supply. Tuner power supply voltage (+5 V) and tuning voltage (+28 V) are generated in step-up converters 224 and 225. During a data transmission break the step-up converters 224 and 225 and the demodulator IC 270 are switched down using a separate power down pin. All devices connected to the tuner power supply (+5 V) are therefore switched off. The IC for the phase locked loop being connected directly to the battery power supply 221 remains ready to lock-in, in the transmission channel frequency. The demodulator retains all the previously used parameters such as the code rate, constellation, guard interval and channel estimation during the data transmission break.

The two step-up converters can be controlled separately, either controlling the +5V step-up converter or both +5 V and +28 V step-up converters. The phase locked loop IC can also be turned down (if this feature supported) from power down switch (IC pin) or via I2c-bus (software) during a longer transmission break. Step-up converters can be controlled from a separate (power) controller or logic, shown in FIG. 2. However, the power may alternatively be switched down using the demodulator I/O-port.

In one embodiment of the present invention the receiver includes a part, preferably an integrated circuit, which has an internal capability of switching off the IC if the supply power decreases below the supply voltage minimum value. The switch controlling the power can be implemented inside the IC itself. This way, even if the step-up converter provide a non-zero output voltage, the IC is switched off internally and does not consume power.

The construction of the control unit of the receiver is not described in a greater detail. In general, the functions in a telecommunication receiver are controlled by a controller including processing capacity in the form of microprocessor(s) and memory in the form of memory circuits. Such arrangements are known as such from the technology of the art. To convert a known telecommunication receiver into a telecommunication device according to the invention, it may be necessary in addition to the hardware changes described above, to store into the memory means a set of machine-readable instructions that instruct the microprocessor(s) of the receiver controller to perform the control operations described above. Composing and storing into memory of such instructions involves known technology which, when combined with the teachings of this patent application, is within the capabilities of a person skilled in the art.

Above, an example embodiment of the solution according to the invention has been described. The principle according to the invention can naturally be modified within the frame of the scope defined by the claims, for example, by modification of the details of the implementation and ranges of use.

Above, DVB-T receiver is used as an example. However, the present invention can naturally be applied, in receivers of any communications system where transmission is not continuous. One example of such a system is Digital Audio Broadcasting (DAB) and mobile telecommunications systems that use Time Division Multiple Access (TDMA) technology.

Above, some examples of values for parameters such as voltages are given. However, other alternative values depending on the circuit design can naturally be applied. Also some circuits, such as a synthesizer circuit, are given that are only to be regarded as illustrative examples.

What is claimed is:

1. A method for receiving radio frequency signals that appear as bursts, the method comprising the steps of:
   providing a local frequency signal with an oscillator,
   controlling a frequency of the oscillator with a phase locked loop,
   mixing an input signal with the local frequency signal for producing an intermediate frequency signal,
   demodulating the intermediate frequency signal for producing a data stream of information,
   turning off a power supply, for a predetermined period of time in accordance with the bursts, to a component performing the step of demodulation,
   wherein a low voltage power is received from a battery whose voltage is converted to a higher voltage value using at least one step up converter,
   wherein the power having the higher voltage value is used to give power to the component performing the step of demodulation, and
   wherein said converter is turned off for the predetermined period of time.

2. A method according to claim 1, wherein the voltage of said battery is converted to a second higher value with a step up converter and the supply power having said second higher voltage value is used for producing an output voltage of the phase locked loop, and said conversion to the second higher value is turned off for the predetermined period of time.

3. A method according to claim 1, further comprising the step of applying a power down pin of an IC for turning down at least one of the phase locked loop, a step up converter and the demodulator.

4. A method for receiving radio frequency signals that appear as bursts, the method comprising the steps of:
   providing a local frequency signal with an oscillator,
   controlling a frequency of the oscillator with a phase locked loop,
   mixing an input signal with the local frequency signal for producing an intermediate frequency signal,
   demodulating the intermediate frequency signal for producing a data stream of information,
   supplying power for a component performing the step of demodulation by turning off a power supply to the component for a predetermined period of time in accordance with the bursts,
   wherein a threshold value is determined for a voltage of supply power for the component, the voltage of the supply power is sensed in the component, and the operation of said component is internally turned off when the value of said supply voltage is lower than said determined threshold value for the supply voltage.

5. A receiver for receiving radio frequency signals which appear as bursts, the receiver comprising:
   an oscillator for producing a local frequency signal,
   a phase locked loop for controlling a frequency of the local frequency signal,
   a mixer for mixing an input signal with the local frequency signal for producing an intermediate frequency signal,
   a demodulator for producing a data stream of information, and
   a power supply supplying power for the receiver by keeping at least a part of the phase locked loop powered during a predetermined period between two consecutive received bursts, and turning off supply power from the demodulator for the predetermined period, said power supply comprising:
a battery for providing low voltage power, and
a first step up converter for providing power of a higher voltage from the low voltage power of the battery, and wherein the first step up converter is arranged to provide power for at least one of an input amplifier, the mixer, and the oscillator; and
wherein the receiver turns off the first step-up converter for the predetermined period.

6. A receiver according to claim 5, wherein the battery is arranged to supply power directly to the phase locked loop.

7. A receiver according to claim 5, wherein the battery is arranged to supply power directly to the demodulator.

8. A receiver according to claim 5, wherein a second step up converter is arranged to provide power for the phase locked loop for producing the control signal for the oscillator.

9. A receiver according to claim 8, wherein the receiver comprises means for turning off said second step-up converter for the predetermined period.

10. A receiver according to claim 5, wherein the oscillator is a voltage controlled oscillator.

11. A receiver according to claim 5, wherein the receiver comprises means for turning off the demodulator for the predetermined period.

12. A receiver according to claim 5, wherein the receiver further comprises a power down pin of an IC for turning down at least one of the phase locked loop, a step up converter and the demodulator.

13. A receiver for receiving radio frequency signals which appear as bursts, the receiver comprising:
an oscillator for producing a local frequency signal,
a phase locked loop for controlling a frequency of the local frequency signal,
a mixer for mixing an input signal with the local frequency signal for producing an intermediate frequency signal,
a demodulator for producing a data stream of information, and
a power supply supplying power for a receiver by keeping at least a part of the phase locked loop powered during a predetermined period between two consecutive received bursts, and turning off supply power from the demodulator for the predetermined period, said power supply comprising:
a battery for providing low voltage power, and
at least one step up converter for providing power of a higher voltage from the low voltage power of the battery;
wherein the receiver senses a voltage of supply power, and turns off the demodulator when a value of the supply voltage is lower than a determined threshold value for the supply voltage.

* * * * *

UNITED STATES PATENT AND TRADEMARK OFFICE
CERTIFICATE OF CORRECTION

PATENT NO. : 6,963,736 B2
DATED : November 8, 2005
INVENTOR(S) : Ilkka Tähtinen

It is certified that error appears in the above-identified patent and that said Letters Patent is hereby corrected as shown below:

<u>Title page,</u>
Item [75], Inventor, replace "Iikka" with -- Ilkka --.

Signed and Sealed this

Twenty-third Day of May, 2006

JON W. DUDAS
*Director of the United States Patent and Trademark Office*